United States Patent [19]

Nebelung et al.

[11] Patent Number: 4,492,595
[45] Date of Patent: Jan. 8, 1985

[54] BOTTOM PLATE MECHANISM FOR A MOULD OF A GLASSWARE CONTAINER MANUFACTURING MACHINE

[75] Inventors: Hermann H. Nebelung, Zurich, Switzerland; Werner-Dieter Knoth, Essen, Fed. Rep. of Germany

[73] Assignee: Emhart Industries, Inc., Farmington, Conn.

[21] Appl. No.: 553,942

[22] Filed: Nov. 21, 1983

[30] Foreign Application Priority Data

Nov. 30, 1982 [GB] United Kingdom ............... 8234098

[51] Int. Cl.³ .............................................. C03B 9/20
[52] U.S. Cl. ...................................... 65/263; 65/267; 65/305; 65/319
[58] Field of Search .................. 65/263, 267, 305, 319

[56] References Cited

U.S. PATENT DOCUMENTS

| | | | |
|---|---|---|---|
| 2,751,715 | 6/1956 | Denman | 65/319 X |
| 3,171,732 | 3/1965 | Andersen | 65/263 X |
| 4,251,253 | 2/1981 | Becker et al. | 65/267 |
| 4,272,273 | 6/1981 | Trahan et al. | 65/319 X |
| 4,388,099 | 6/1983 | Hermening et al. | 65/267 |

*Primary Examiner*—Robert Lindsay
*Attorney, Agent, or Firm*—H. Samuel Kieser

[57] ABSTRACT

The bottom plate mechanism has an adaptor plate (10) on which bottom plates of one or more moulds are mounted. The adaptor plate contains passages (14,20) which connect an inlet (16) thereof to a source of vacuum through a filter (72). In order that the filter may be rapidly changed, the adaptor plate is supported by a vertically-extending tubular member (24) which is supported for height adjustment, with a cylindrical projection (12) of the adaptor plate telescopically received within the tubular member. The arrangement is such that the adaptor plate (10) may be lifted away from the tubular member (24) so that the cylindrical projection (12) and filter (72), which is mounted on the cylindrical projection, leave the tubular member.

8 Claims, 2 Drawing Figures

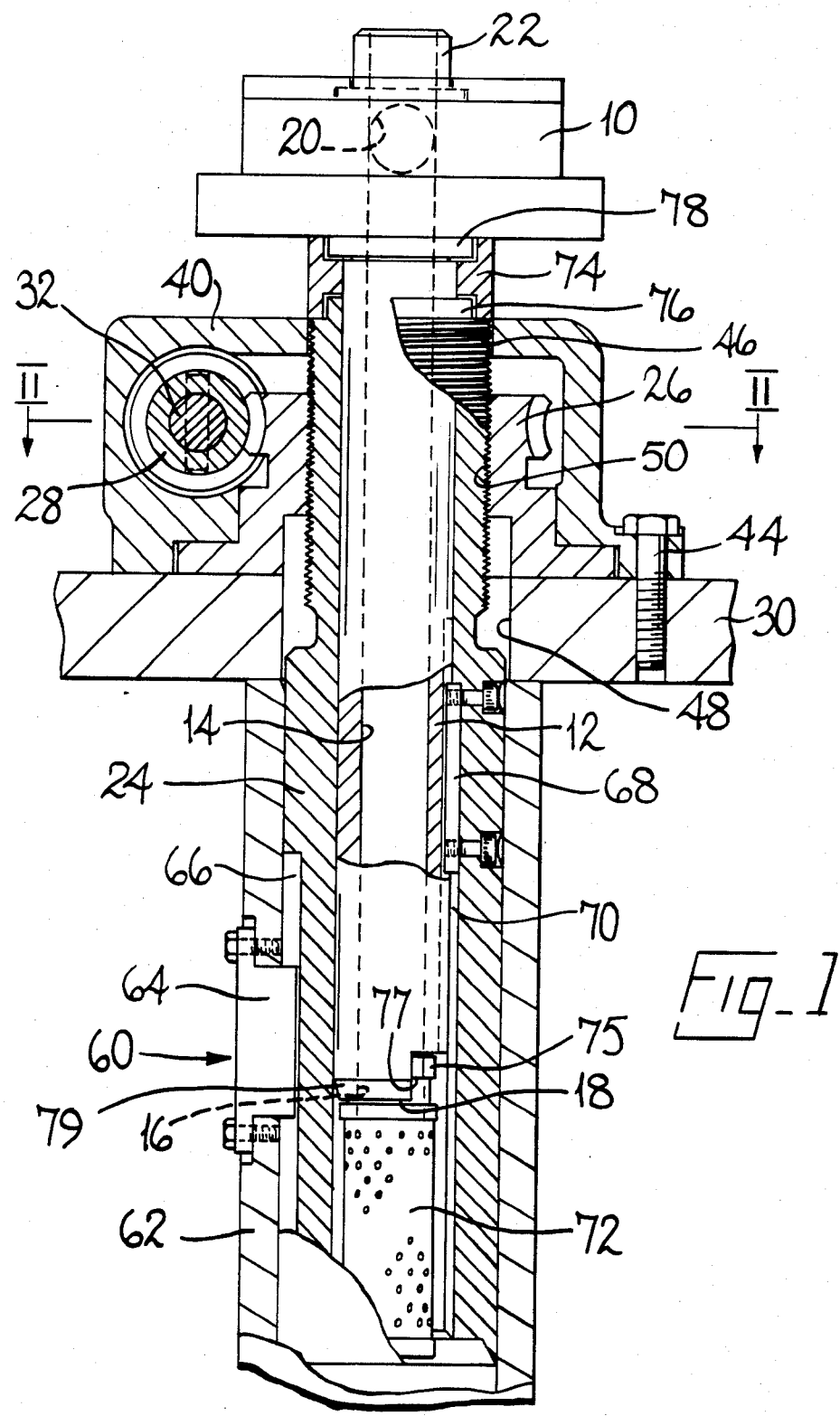
Fig_1

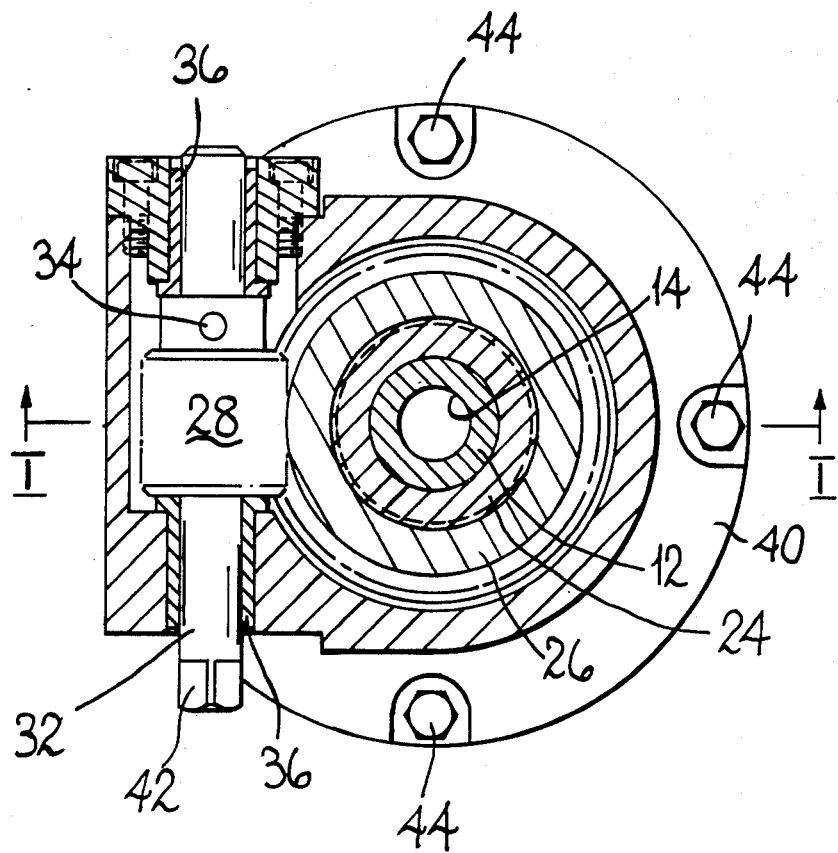
Fig_2

BOTTOM PLATE MECHANISM FOR A MOULD OF A GLASSWARE CONTAINER MANUFACTURING MACHINE

BACKGROUND OF THE INVENTION

This invention is concerned with a bottom plate mechanism for a mould of a glassware container manufacturing machine comprising an adaptor plate which provides a support for one or more mould bottom plates and contains passages which connect an inlet of the adaptor plate to the or each bottom plate supported thereby so that, when vacuum is applied to the inlet, air is sucked from the or each bottom plate, connecting means on which the adaptor plate is mounted which connects the inlet to a vacuum source, a filter which serves to prevent particles sucked from the or each bottom plate from reaching the vacuum source, and height adjustment means operable to vary the height at which the adaptor plate is supported, the connecting means being arranged to maintain the connection between the inlet and the vacuum source as the height of the adaptor plate is varied.

A conventional glassware container manufacturing machine of the so-called "individual section" type has parison forming means which operates to form a parison out of molten glass. The formed parisons are then transferred to moulds in which they are blown to the shape of the container required. These moulds comprise a bottom plate which remains stationary during the operation of the machine and two side portions which are movable toward and away from one another to open and close the mould. While the parison is blown in the mould, air is sucked from the mould through the bottom plate so that the air does not prevent the parison from reaching the shape required. To this end, the bottom plate or, where two or more moulds are operated together, the bottom plates are mounted on an adaptor plate which supports them and contains passages which connect an inlet at the bottom of the adaptor plate to the or each bottom plate so that, when vacuum is applied to the inlet, air is sucked from the bottom plate or plates.

In conventional machines, the adaptor plate has a downward projection in which the inlet is formed and is clamped, by means of a clamping ring which acts on the downward projection, to a bracket of the machine. The bracket is mounted for heightwise sliding movement on a frame of the machine and height adjustment means is operable to vary the height at which the bracket is supported on the frame and therefore the height at which the adaptor plate is supported. The bracket forms connecting means operable to connect the inlet of the adaptor plate to a vacuum source. To this end, the bracket contains two ducts, one of which communicates with the inlet of the adaptor plate and the other of which receives in a telescopic manner a cylindrical end portion of a fixed duct which passes to the vacuum source. The two ducts communicate with one another through a valve mounted in a cartridge which is bolted to the bracket and is operable to either connect the two ducts together so that vacuum is applied to the adaptor plate or to break the communication between the ducts. The cartridge also contains a filter extending across one of the ducts which serves to prevent particles of molten glass or other debris sucked from the or each bottom plate from reaching the vacuum source where it might do damage.

In the conventional bottom plate mechanism mentioned above, it is sometimes necessary to change the filter as it becomes clogged with debris. To do this, the cartridge is unbolted from the bracket and either replaced by another cartridge or the filter is removed from the cartridge, and replaced by another filter, and the cartridge is rebolted to the bracket. In both cases, the operation of the machine has to be suspended for a considerable period during which the replacement of the cartridge takes place so that considerable delays in the operation of the machine are experienced. Furthermore, where the entire cartridge is replaced, a supply of cartridges needs to be maintained which is expensive. When the adaptor plate requires changing, it is necessary to loosen the aforementioned clamping ring which also creates delays in the operation of the machine.

It is an object of the present invention to provide a bottom plate mechanism for a mould of a glassware container manufacturing machine in which the filter can be changed more rapidly than in the aforementioned conventional machine with a consequent saving in production losses.

BRIEF SUMMARY OF THE INVENTION

The invention provides a bottom plate mechanism for a mould of a glassware container manufacturing machine comprising an adaptor plate which provides support for one or more mould bottom plates and contains passages which connect an inlet of the adaptor plate to the or each bottom plate supported thereby so that, when vacuum is applied to the inlet, air is sucked from the or each bottom plate, connecting means on which the adaptor plate is mounted which connects the inlet to a vacuum source, a filter which serves to prevent particles sucked from the or each bottom plate from reaching the vacuum source, and height adjustment means operable to vary the height at which the adaptor plate is supported, the connecting means being arranged to maintain the connection between the inlet and the vacuum source as the height of the adaptor plate is varied, wherein the adaptor plate is supported by a vertically-extending tubular member of the connecting means which is supported for vertical adjustment by the height adjustment means, the tubular member being telescopically received in a fixed duct of the connecting means leading to the vacuum source, and the adaptor plate comprises a cylindrical projection which is telescopically received in the tubular member and in which the inlet is formed within the tubular member, the filter being mounted on the cylindrical projection so that it extends across the inlet, the arrangement being such that the adaptor plate may be lifted away from the tubular member so that the cylindrical projection and filter leave the tubular member.

In a bottom plate mechanism as described in the last preceding paragraph, the adaptor plate can be lifted out of the connecting means without the necessity of undoing any bolts or clamps. Thus, the adaptor plate may rapidly be exchanged or the filter on the projection of the adaptor plate may be exchanged rapidly and away from the remainder of the machine. Thus, it is possible to change the filter and/or the adaptor plate rapidly, thereby minimising production losses.

Conveniently, the tubular member may be externally screw-threaded and be supported by a threaded connection with an internally threaded member of the height adjustment means, the arrangement being such that rotation of the internally threaded member causes heightwise movement of the tubular member. In this case, the internally threaded member may be a worm gear arranged to be rotated by rotation of a worm which is meshed with the worm gear.

Conveniently, the inlet of the adaptor plate may be in a bottom end surface of the cylindrical projection and the filter in the form of a cylinder coaxial with the projection and mounted on the bottom thereof.

In order to ensure that the adaptor plate is correctly aligned relative to the remainder of the machine, conveniently there may be a key connection between the tubular member and the cylindrical projection. The key connection will ensure that the projection only enters the tubular member in the correct alignment.

In order to prevent rotation of the tubular member as it is moved by the height adjustment means, there may be a key connection between the tubular member and the fixed duct. This key connection will assure correct alignment of the tubular member relative to the machine.

In order to increase the range of height adjustment of the adaptor plate, conveniently the adaptor plate and the tubular member may be arranged to receive a spacer ring which rests on the tubular member and on which the adaptor plate rests. Spacer rings of different length may be used to vary the height of the adaptor plate in addition to the variation achieved by the height adjustment means.

BRIEF DESCRIPTION OF THE DRAWINGS

There now follows a detailed description, to be read with reference to the accompanying drawings, of a bottom plate mechanism for a mould of a glassware container manufacturing machine which is illustrative of the invention. It is to be understood that the illustrative bottom plate mechanism has been selected for description by way of example and not of limitation of the invention.

In the drawings:

FIG. 1 is a vertical cross-sectional view of the illustrative bottom plate mechanism taken on the line I—I in FIG. 2, and FIG. 2 is a cross-sectional view taken on the line II—II in FIG. 1.

DETAILED DESCRIPTION OF PREFERRED EMBODIMENT OF THE INVENTION

The illustrative bottom plate mechanism shown in the drawings is for a mould of a glassware container manufacturing machine of the individual section type. The mechanism comprises an adaptor plate 10 which provides a support for two bottom plates (not shown). The adaptor plate 10 comprises a cylindrical downwards projection 12 which is hollow and defines a cylindrical passage 14 leading to an inlet 16 of the adaptor plate 10 in a bottom end surface 18 of the cylindrical projection 12. The passage 14 communicates with a horizontal passage 20 which in turn communicates with two hollow floating sealing members 22 which are mounted on the adaptor plate 10 (only one of the members 22 is visible in FIG. 1). Each of the sealing members 22 is received in a recess of a bottom plate (not shown) mounted on the adaptor plate when the bottom plate mechanism is in use in a machine. Thus, the adaptor plate 10 contains passages 14 and 20 which connect the inlet 16 thereof to the bottom plates supported by the adaptor plate 10 so that, when vacuum is applied to the inlet 16, air is sucked from the bottom plates.

The illustrative bottom plate mechanism also comprises connecting means on which the adaptor plate 10 is mounted which connects the inlet 14 to a vacuum source (not shown). The connecting means comprises a vertically-extending tubular member 24 which is supported for vertical adjustment by height adjustment means of the illustrative bottom plate mechanism. The adaptor plate 10 is supported by the tubular member 24 with the cylindrical projection 12 received telescopically in the tubular member 24. Thus, the inlet 16 is formed within the tubular member 24.

The height adjustment means comprises an internally threaded member in the form of a worm gear 26 and a worm 28 meshed with the gear 26. The worm gear 26 and worm 28 are mounted on a frame member 30 of the glassware container manufacturing machine with the arrangement being such that when the worm 28 is turned by turning a shaft 32 on which the worm 28 is mounted, the worm gear 26 is caused to rotate about a vertical axis. The shaft 32 (see FIG. 2) is mounted on bearings 36 which are mounted on housing 40 within which the worm gear 26 is enclosed. The worm 28 is fixed to the shaft 32 by means of a pin 34 and the shaft 32 is provided with a flatted portion 42 by which the shaft may be turned when desired. The housing 40 is bolted to the frame 30 by means of bolts 44 and defines a cylindrical passage 46 extending vertically therethrough in alignment with a vertical passage 48 through the frame 30. The tubular member 24 passes through the aligned passages 46 and 48 and also through an internally threaded passage 50 through the worm gear 26. The portion of the tubular member 24 which passes through the passage 50 is externally threaded and is threadedly connected with the worm gear 26. Thus, the tubular member 24 is supported by its threaded connection with the internally threaded worm gear 26.

When it is desired to vary the height of the adaptor plate 10, the worm 28 is turned by turning the shaft 32. This causes the gear 26 to rotate so that the tubular member 24 is moved vertically in the passages 48, 46 and 50 so that the adaptor plate 10 supported by the tubular member 24 is moved vertically. The tubular member 24 is prevented from turning with the gear 26 by a key connection 60 between the tubular member 24 and a fixed vacuum duct 62 into which the tubular member is telescopically received. This key connection 60 also serves to orientate the tubular member 24 relative to the machine. The fixed vacuum duct 62 is mounted on the frame member 30 beneath the housing 40 and opens into the passage 48 through the frame member 30. The key connection 60 comprises a key 64 mounted on the duct 62 and extending into a longitudinal slot 66 in the tubular member 24. The tubular member 24 also carries a key 68 which extends into a longitudinal slot 70 in the cylindrical projection 12. The key 68 provides a key connection between the tubular member 24 and the cylindrical projection 12 which serves to ensure that the adaptor plate 10 is correctly aligned on the machine.

The illustrative bottom plate mechanism also comprises a filter 72 which serves to prevent particles sucked from the bottom plate from reaching the vacuum source. The filter 72 is mounted on the cylindrical projection 12 of the adaptor plate 10 so that it extends across the inlet 16 thereof. The filter is in the form of a cylinder coaxial with the projection 12 and mounted on the bottom thereof. An upper cylindrical portion 75 of the filter 72 has a groove 77 therein and an internal horseshoe-shaped projection (not shown) on a semi-circular downwards projection 79 of the projection 12 fits into the groove 77 to support the filter 72. The filter 72 is thus mounted on the projection 12 so that it can be readily exchanged when necessary.

The illustrative bottom plate mechanism also comprises a spacer ring 74. The spacer ring 74 rests on top of the tubular member 24 and the adaptor plate 10 rests on top of the spacer ring 74 with the projection 12 passing through the spacer ring 74. The adaptor plate 10 and the tubular member 24 are arranged to receive the spacer ring 74 in that an upper portion 76 of the tubular member 24 is shaped to be received within the spacer ring 74 and likewise a lower portion 78 of the adaptor plate 10 surrounding the projection 12 is arranged to be received in the spacer ring 74. The spacer ring 74 rests on the tubular member 24 and the adaptor plate 10 rests on the spacer ring 74 so that the height at which the adaptor plate 10 is held by the tubular member 24 is determined by the length of the spacer ring 74. The arrangement is thus such that, by replacement of the spacer ring 74 with a spacer ring of a different length, the height of the adaptor plate 10 can be adjusted. This provides a coarse adjustment for the height of the adaptor plate 10 with the fine adjustment being achieved by the use of the worm 28 and worm gear 26.

In the operation of the machine with which the illustrative bottom plate mechanism is used, the length of the ring 74 is selected to be appropriate to the height of the moulds to be used and the worm 28 and worm gear 26 are used to bring the adaptor plate 10 to exactly the correct height. It should be noted that the connecting means provided by the fixed duct 62 and the tubular member 24 is arranged to maintain the connection between the inlet 16 of the adaptor plate and the vacuum source as the height of the adaptor plate is varied. When it is desired to apply vacuum to the bottom plates of the mould, the vacuum is applied to the fixed duct 62 so that air is sucked through the passages 20 and 14 to the inlet 16 and through the filter 72. When it becomes necessary to replace the filter 72 because it has become clogged, the adaptor plate 10 may be lifted away from the tubular member, as it only rests on the spacer ring 74, so that the cylindrical projection 12 and the filter 72 leave the tubular member 24. The filter 72 may now be readily exchanged, if necessary away from the machine, and the adaptor plate 10 rapidly replaced by inserting the projection 12 back into the tubular member 24. When this is done the key 68 ensures that the adaptor plate is replaced in its correct orientation. Likewise if it is desired to replace the adaptor plate 10, this can be done by lifting the old adaptor plate away from the tubular member 24 and inserting the cylindrical projection 12 of the new adaptor plate 10 into the tubular member 24. It will be noted that height adjustment of the adaptor plate 10 can rapidly be achieved by lifting the adaptor plate 10 away from the tubular member 24 and replacing the spacer ring 74 with a spacer ring of a different length, if necessary operating the worm 28 to do a fine adjustment of the height.

We claim:

1. A bottom plate mechanism for a mould of a glassware container manufacturing machine comprising an adaptor plate which provides a support for one or more mould bottom plates and contains passages which connect an inlet of the adaptor plate to the or each bottom plate supported thereby so that, when vacuum is applied to the inlet, air is sucked from the or each bottom plate, connecting means on which the adaptor plate is mounted which connects the inlet to a vacuum source, a filter which serves to prevent particles sucked from the or each bottom plate from reaching the vacuum source, and height adjustment means operable to vary the height at which the adaptor plate is supported, the connecting means being arranged to maintain the connection between the inlet and the vacuum source as the height of the adaptor plate is varied, wherein the adaptor plate is supported by a vertically-extending tubular member of the connecting means which is supported for vertical adjustment by the height adjustment means, the tubular member being telescopically received in a fixed duct of the connecting means leading to the vacuum source, and the adaptor plate comprises a cylindrical projection which is telescopically received in the tubular member and in which the inlet is formed within the tubular member, the filter being mounted on the cylindrical projection so that it extends across the inlet, the arrangement being such that the adaptor plate may be lifted away from the tubular member so that the cylindrical projection and filter leave the tubular member.

2. A bottom plate mechanism according to claim 1, wherein the tubular member is externally screwthreaded and is supported by a threaded connection with an internally threaded member of the height adjustment means, the arrangement being such that rotation of the internally threaded member causes heightwise movement of the tubular member.

3. A bottom plate mechanism according to claim 2, wherein the internally threaded member is a worm gear arranged to be rotated by rotation of a worm which is meshed with the worm gear.

4. A bottom plate mechanism according to any one of claims 1 to 3, wherein the inlet of the adaptor plate is in a bottom end surface of the cylindrical projection thereof and the filter is in the form of a cylinder coaxial with the projection and mounted on the bottom thereof.

5. A bottom plate mechanism according to any one of claims 1 to 3, wherein a key connection is formed between the tubular member and the cylindrical projection of the adaptor plate.

6. A bottom plate mechanism according to any one of claims 1 to 3, wherein a key connection is formed between the tubular member and the fixed duct.

7. A bottom plate mechanism according to claim 6, wherein a key connection is formed between the tubular member and the fixed duct.

8. A bottom plate mechanism according to any one of claims 1 to 3, wherein the adaptor plate and the tubular member are arranged to receive a spacer ring which rests on the tubular member and on which the adaptor plate rests.

* * * * *